(12) United States Patent  
Schmidt et al.

(10) Patent No.: US 6,609,358 B1
(45) Date of Patent: Aug. 26, 2003

(54) MOWER HAVING A MOWER DECK ADAPTED FOR SELECTIVE MULCHING OR NON-MULCHING MODES

(75) Inventors: Michael Todd Schmidt, Holly Springs, NC (US); Brian Charles Kelly, Apex, NC (US); James Anthony Palmer, Raleigh, NC (US); Brian Matthew Adkins, Apex, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/179,548

(22) Filed: Jun. 25, 2002

(51) Int. Cl.[7] ............................................... A01D 34/66

(52) U.S. Cl. ..................................................... 56/320.2

(58) Field of Search ...................... 56/2, 6, 7, 320.1, 56/320.2, 16.7, 16.9, 13.5, 13.6, 17.4, 17.5, 255, 295, DIG. 9

(56) References Cited

U.S. PATENT DOCUMENTS

| | | |
|---|---|---|
| 2,578,880 A | 12/1951 | Doyle |
| 2,857,727 A | 10/1958 | Cole |
| 3,234,719 A | 2/1966 | Rank |
| 3,404,519 A | 10/1968 | Demers |
| 3,696,595 A | 10/1972 | Dahl |
| 3,925,972 A | 12/1975 | Anderson |
| 4,226,074 A | 10/1980 | Mullet et al. |
| 5,205,112 A | 4/1993 | Tillotson et al. |
| 5,465,564 A | 11/1995 | Koehn et al. |
| 5,628,171 A | 5/1997 | Stewart et al. |
| 5,845,475 A | 12/1998 | Busboom et al. |
| 6,192,666 B1 | 2/2001 | Sugden et al. |

Primary Examiner—Robert E. Pezzuto (57) ABSTRACT

A mower deck having movable chamber gate members that permit the deck to selectively operate in either a discharge or mulching mode of operation. The deck includes a control structure that operates the gate members to permit the operator to quickly and easily switch between the discharge mode and the mulching mode while mowing.

13 Claims, 6 Drawing Sheets

FIG. 6 ically or

MOWER HAVING A MOWER DECK ADAPTED FOR SELECTIVE MULCHING OR NON-MULCHING MODES

FIELD OF THE INVENTION

This invention relates to mower cutting decks, and more specifically, to converting those decks between discharge and mulching modes of operation.

BACKGROUND OF THE INVENTION

Mower cutting decks are available in at least two types. The first of these decks is ordinarily provided as a side or rear discharge deck. In other words, after grass and other vegetation has been cut, it is circulated within the deck and conveyed toward a discharge outlet to be thrown onto the adjacent ground surface. A second type of mower deck is the mulching deck. With this mulching type, the deck does not have a discharge outlet. The grass is cut and recut within a closed cutting chamber, ultimately being distributed by the blade onto the ground surface beneath the deck. This process offers a first advantage of providing finely cut grass and other vegetation as mulch which acts as a natural fertilizer. A second advantage exists since an operator need not spend additional time in raking or otherwise collecting clippings which have been cut since the mulch is dispersed over the ground surface.

Kits are available to convert a discharge deck into a mulching deck. These kits often require the operator to first stop mowing and to reposition the deck in order to install them. Such installation can be inconvenient and time consuming, thereby reducing the operator's efficiency since the amount of vegetation that can be mowed in a given time period is decreased.

The use of these kits also raises concerns when it is required that they be removed. Their removal ordinarily arises when the grass conditions are either too wet, too tall and/or too thick so as to not permit proper mulching of the grass and other vegetation. First, the kits are time consuming to remove. Second, in instances in which mulching is attempted in one or more of the above conditions, clogging often occurs within the cutting chamber which causes diminished cut quality. Third, when these kits are removed, their storage and the ability to again locate their different components become added responsibilities to be addressed by the operator.

Thus, it would be beneficial to provide a mower cutting deck capable of being selectively operable between discharge and mulching modes without having to separately attach or detach additional components to the deck each time that conversion between these modes is desired or necessary. It would be also desirable to be able to allow the operator to selectively make the conversion while remaining seated on the mower. Providing such a deck enables an operator to avoid the inconvenience of having to stop mowing to either remove or install a mulch kit so as to allow mowing of vegetation in either the discharge or mulching mode, respectively.

SUMMARY OF THE INVENTION

Accordingly, there is provided a mower cutting deck which can be selectively converted and operated between discharge and mulching modes. This conversion can be accomplished "on the fly", i.e., while the operator remains seated on the mower and continues to mow. The appropriate mode of operation is often determined by factors including the moisture content, length and/or thickness of the vegetation being mowed.

To permit the discharge or mulching of vegetation while continuing to mow, the deck is equipped with adjustable gates. The gates can be selectively moved to an open or first position in which vegetation is permitted to move between the chambers and through the discharge opening. From this first position, the gates may be moved or shifted to a closed or second position in which vegetation is restricted from moving between the chambers and out of the discharge opening. Opening of the gates permits the deck to operate in its discharge mode so that the vegetation may be simply thrown on the ground. Closing of the gates causes the cut vegetation to be reflected off of them and a wall member formed by adjacent baffle portions and portions of the deck skirt. After moving off of the gates and the wall member, the vegetation is recut before it is forced downwardly toward the ground and deposited as mulch.

The gates are selectively moveable to each of the above positions through use of a handle attached to the top surface of the deck. Either the discharge or mulching mode can be selected during mowing simply through movement of the handle. Use of the handle permits an operator to avoid the need to stop mowing to have to install or remove equipment such as a mulch kit since the handle is reachable from the operator's seat. Additionally, while the preferred embodiment contemplates the use of a manually operated handle to control movement of the gates, it is to be further understood that the gates could be controlled by motorized means or devices which may, for instance, be either hydraulically or electrically driven.

The above and additional features and advantages of the present invention will become apparent from a reading of the following detailed description of the invention when taken in conjunction with the accompanying drawings.

DESCRIPTION OF THE PREFERRED EMBODIMENT

Figure 1:
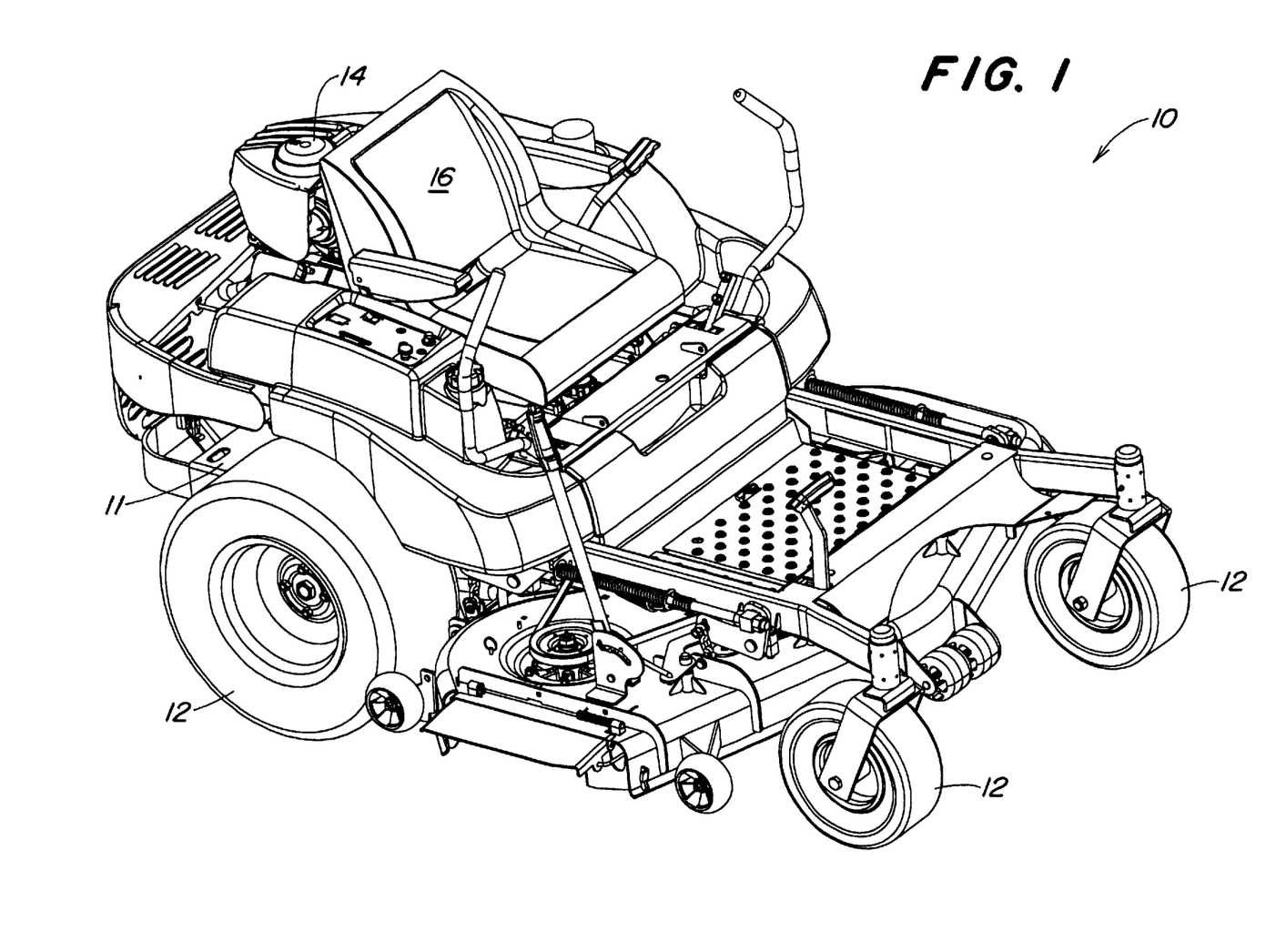
FIG. 1 is a side and elevated perspective view of the mower of the present invention.

Looking first to FIG. 1, there is shown a mower 10 having a frame 11 supported upon ground engaging wheels 12. The mower 10 is powered by an engine 14 located behind an operator's seat 16. A cutting deck (discussed below) is attached to the front of the mower 10 for mowing vegetation in either a discharge or mulching mode.

Figure 2:
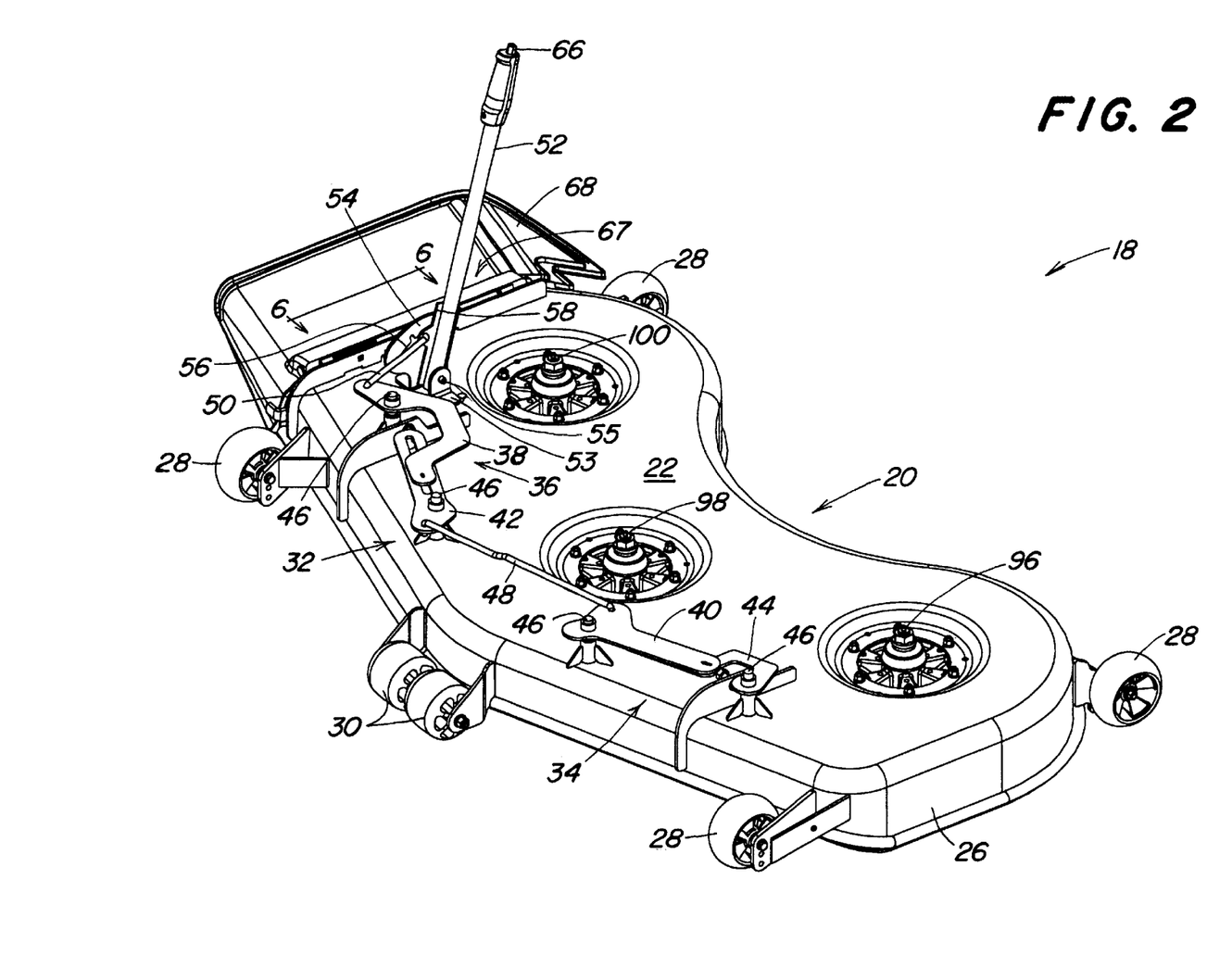
FIG. 2 is a front and side elevated perspective view of the mower cutting deck, as seen in FIG. 1, in which there is shown a mode selection handle that is positioned to place the deck in its discharge mode.

Looking now to FIG. 2, there is shown a multi-chamber cutting deck 18 that is seen attached to the mower 10 of FIG. 1. The deck 18 includes a top member 20 having a top surface 22 and a bottom surface 24 (shown in FIG. 3). The deck 18 further includes a skirt 26 extending downwardly from the top member 20. The skirt 26 provides an exterior or side surface of the deck 18 from which a plurality of wheels, including anti-scalp wheels 28,30, extend to prevent the deck 18 from becoming too close to the ground when traveling over uneven portions thereof.

Figure 5:
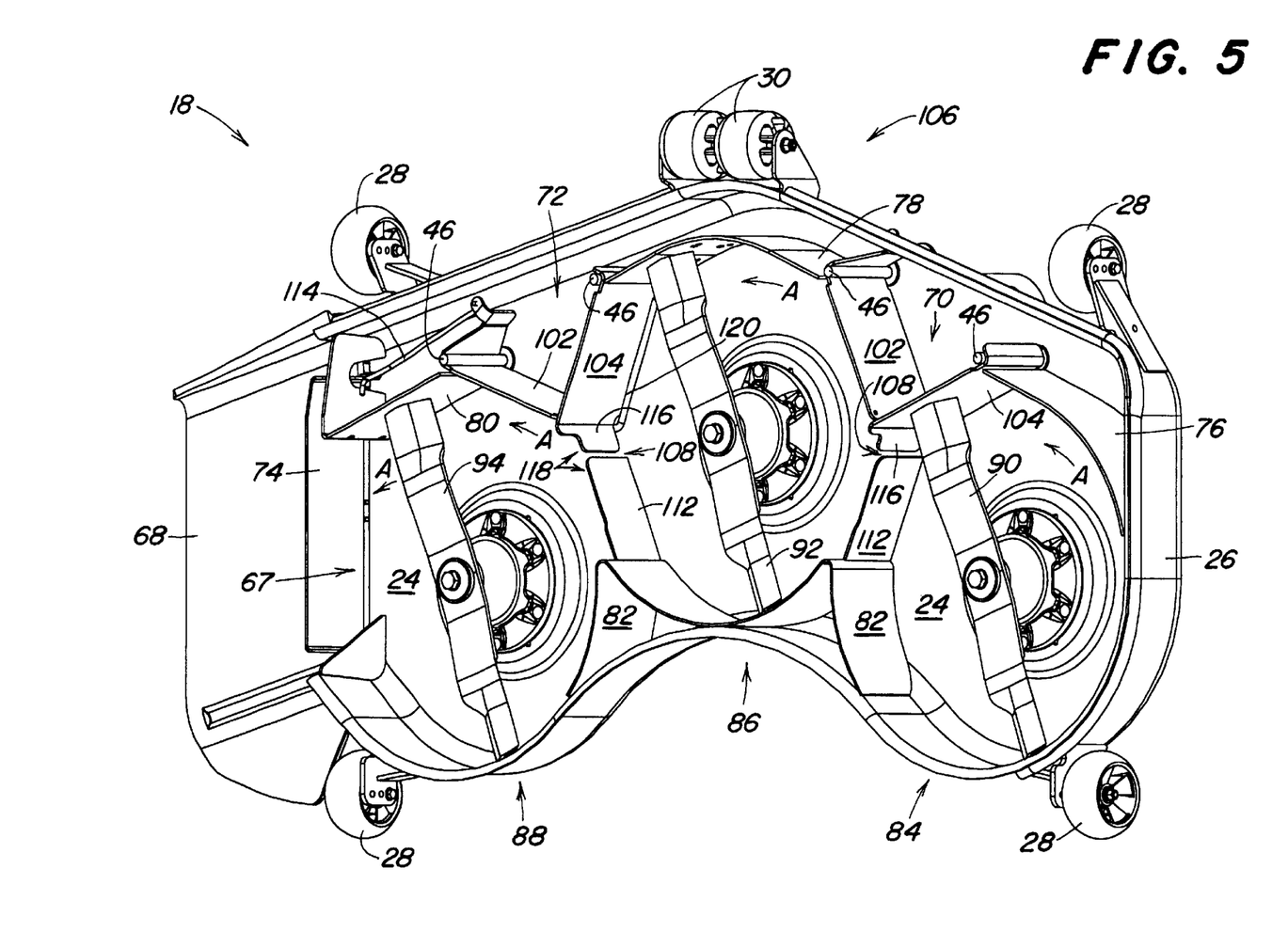
FIG. 5 is a view of the underside of the cutting deck showing the gates moved to their closed position, as controlled by the handle.

Also shown on the top surface 22 is a control structure 32 mounted therewith for selectively operating or shifting a plurality of attached gates (discussed below) between open or closed positions. Still looking to FIG. 2, it can be seen that the control structure 32 includes a left and a right set of cranks 34,36. The cranks 34,36 include driven members 38,40 and respective follower members 42,44. Each of these members is seated on pivot shafts 46. The cranks 34,36 are interconnected by a rod or linkage 48. The right crank 36 is also connected by a rod 50 to a handle 52 that is used to move the sets of cranks 34,36 and their associated gates which are shown in FIGS. 3 and 5.

As seen in FIG. 1, the handle 52 is reachable from the operator's seat 16. The ability to reach and move the handle 52 from the operator's seat permits easy shifting between the discharge and mulching modes while mowing.

Figure 6:
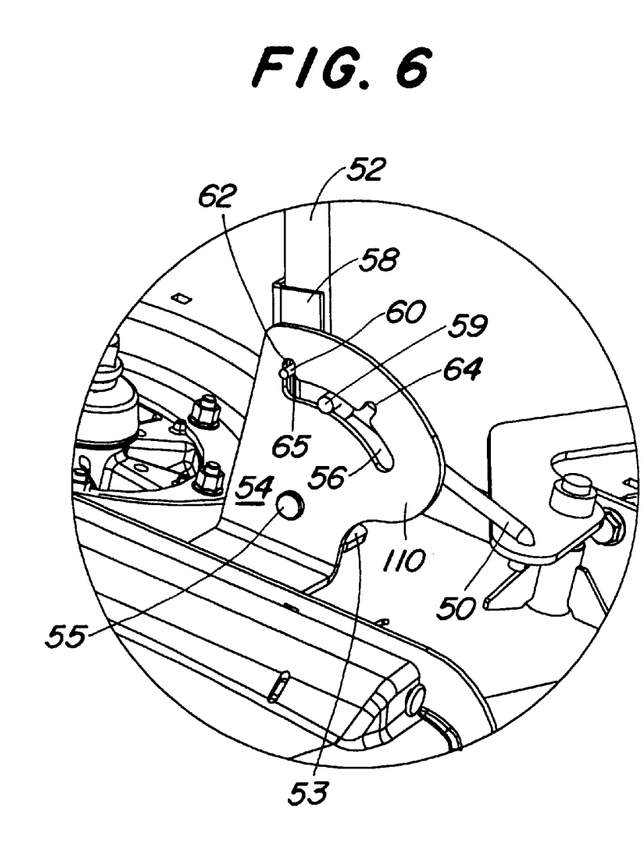
FIG. 6 is an enlarged view, taken along lines 6—6 of FIG. 2, of the handle and an associated pin that is positioned within the bracket so as to dispose the gates in their open position.
Figure 7:
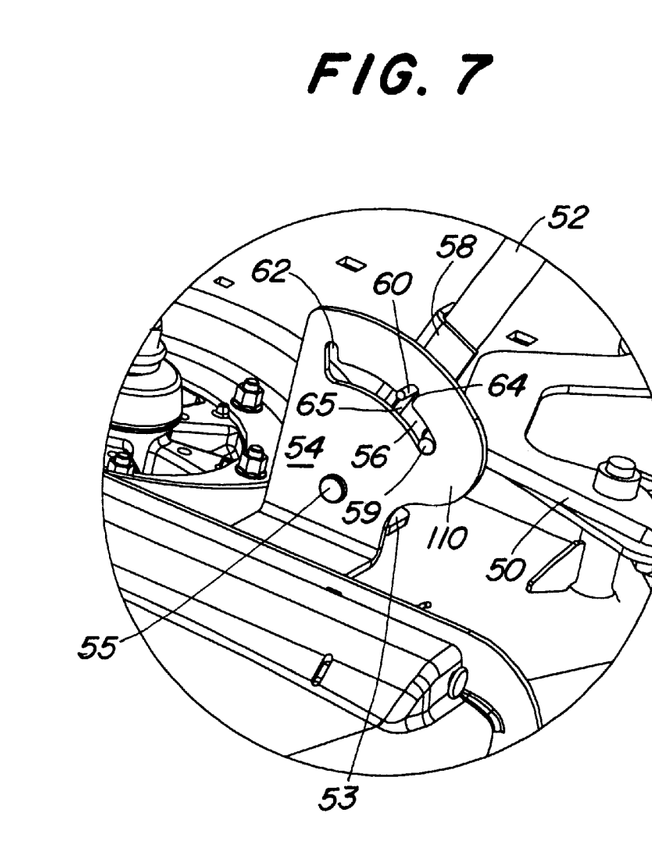
FIG. 7 is an enlarged view, taken along lines 7—7 of FIG. 4, of the handle and its pin whereby the pin is positioned within the bracket so as to dispose the gates in their closed position.

Now looking to FIGS. 6 and 7, the handle 52 is mounted to the deck 18 through a pair of brackets 53,54 and by a pivot pin 55. The handle 52 includes a bracket 58 that is mounted or welded on its outer surface. An end 59 of rod 50 extends through the bracket 58 and into a slot 56 in the bracket 54 for moving within the slot 56. The rod 50, moving within the slot 56, limits travel of the handle 52 in one direction. The handle 52 further includes a pin 60 which extends therefrom and into the slot 56. The pin 60 may be seated within notches or detents 62,64 provided in the bracket 54 for selectively locking the handle 52, and thus the control structure 32, into position. The pin 60 may be moved up and down within a vertical slot 65 formed in the outer surface of the handle 52 and its attached bracket 58, as seen in FIG. 6. A push button 66 at the top end of the handle 52, and as shown most clearly in FIGS. 2 and 4, controls movement of the pin 60. Depression of the button 66 releases the pin 60 from engagement with one of the notches 62 or 64. Afterward, the handle 52 may be moved to shift the gates between their open and closed positions.

Figure 3:
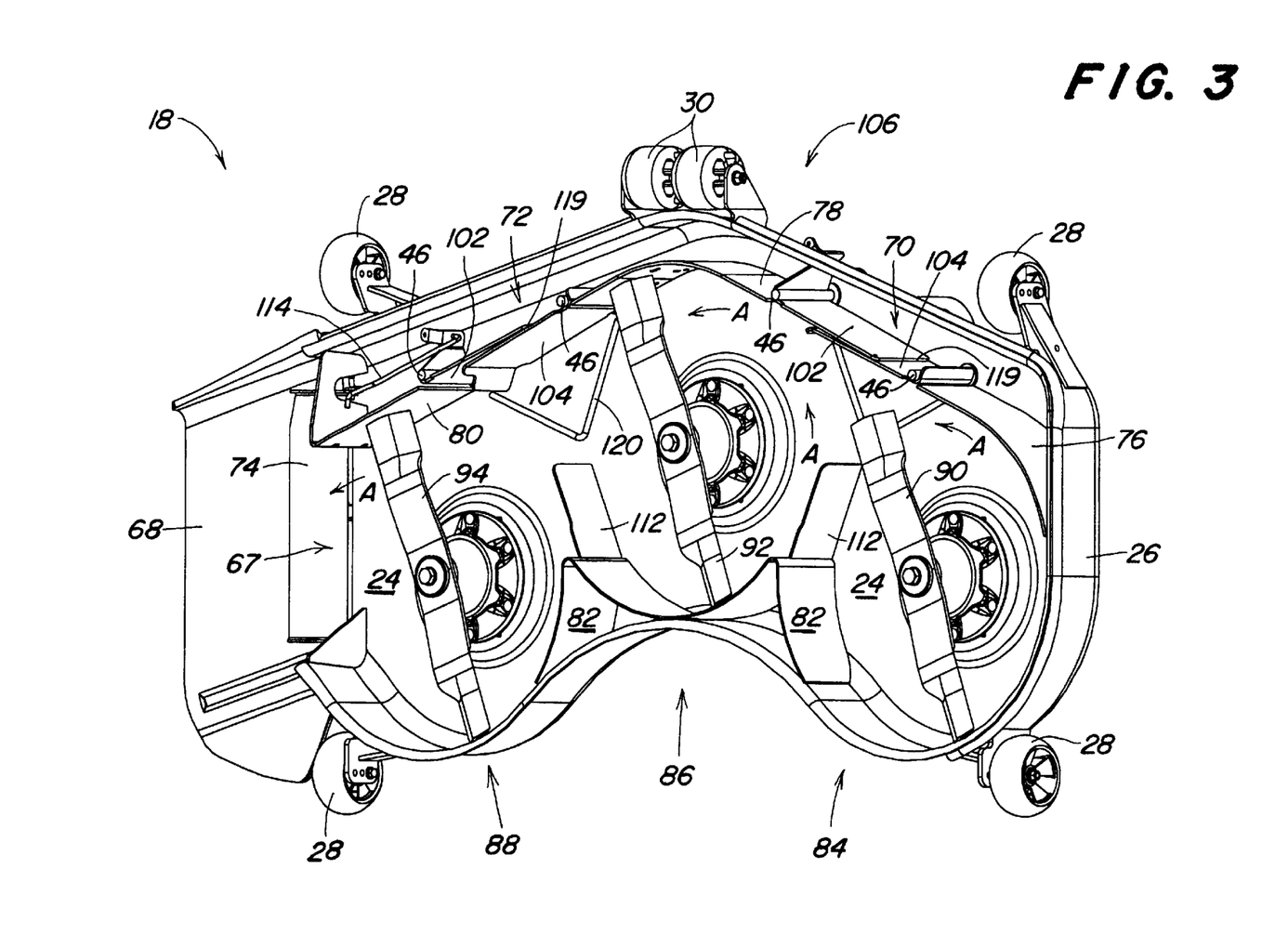
FIG. 3 is a view of the underside of the cutting deck showing a series of gates that are moved by the handle of FIGS. 1 and 2 to their open position.

Looking next to the underside of the deck 18 as shown in FIG. 3, closure members or gates 70, 72 and 74 are shown. Also shown are a collection of front baffles 76, 78, 80 and a rear baffle 82 that are attached to the bottom surface 24 of the deck 18. The baffles extend from the skirt 26, and together with the skirt 26, form a substantially continuous wall or wall member that substantially defines three adjacent cutting chambers 84, 86 and 88. It is to be noted that the manner in which the wall is formed constitutes no part of the present invention.

As further shown in FIG. 3, one of three cutting blades 90, 92 and 94 is housed within a single chamber. Each of these blades is powered by the engine 14 and is supported on a respective spindle 96, 98 or 100, as shown for example in FIG. 2, for rotation therewith. Referring again to FIG. 3, as the blades rotate, vegetation is cut and swept along a flow pathway "A" which extends between the cutting chambers and which continues through a discharge opening 67 formed along the skirt portion of the wall member. The vegetation moves between the chambers 84, 86 and 88 and out of the discharge opening 67 since the gates 70, 72 are substantially aligned with the front baffles 76, 78 and 80 and gate 74 is substantially aligned with the top surface 22 of the deck 18. This alignment corresponds with the open position of the gates.

As also shown in FIG. 3, the gates 70 and 72 are formed by pairs of plates 102,104. The plates 102,104 are mounted with the pivot shafts 46 so as to swing or shift when the driven and follower members 38, 40, 42 and 44 are moved in response to movement of the handle 52. Each of the pairs of plates 102,104 are swingable to their open position or toward the front 106 of the deck 18 to permit vegetation to flow toward the discharge opening 67. They may also be swung to a closed position or away from the front 106. When in this position, the plates 102,104 block the pathway "A". As mentioned below, the gates 70 and 72, as formed by the plates 102 and 104, angularly extend or project from portions of the wall member and the gate 74 blocks the discharge opening 67 in their closed position. This restricts vegetation flow to permit a deck configuration compatible for mulching as shown and discussed with reference to FIGS. 4–5 below.

In the preferred embodiment, the baffle portions and gates, when in the their closed position, provide a circumferential lower periphery which falls below the cutting plane established by each of the blades. When the gates are in this closed position, they and the wall member substantially enclose the blades and thereby provide the necessary recirculation for mulching capability. While the preferred embodiment utilizes gates that leave a small opening 108 in the chamber periphery as seen in FIG. 5, this opening does not significantly affect the mulching capability of the particular chamber. It is to be understood that gates with other effective configurations that achieve this objective could be utilized.

Figure 4:
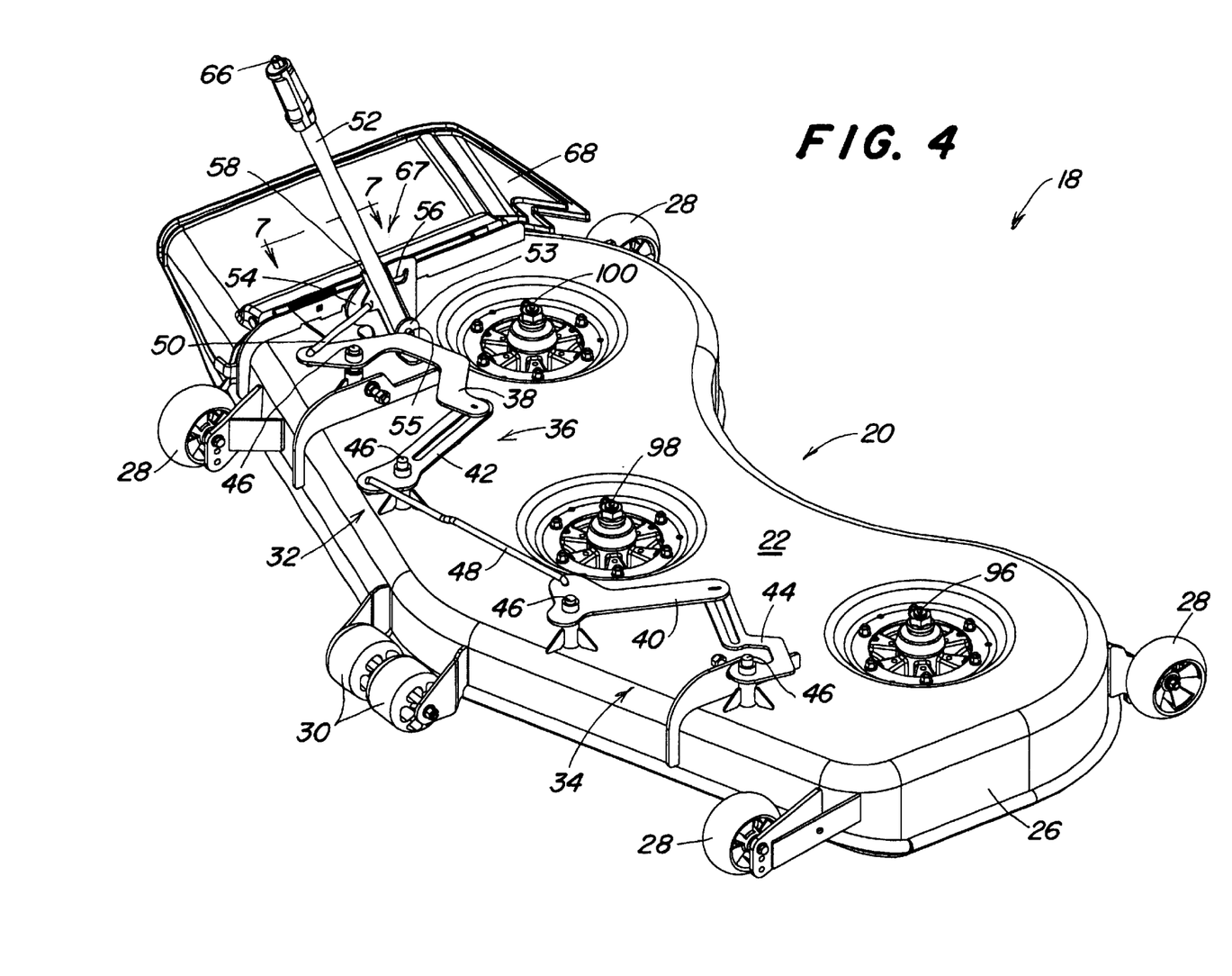
FIG. 4 is a front and side elevated perspective view of the deck wherein the handle is positioned to place the deck in its mulching mode.

With reference to FIGS. 4–5, the deck 18 is shown in its mulching mode. The handle 52, as shown in FIGS. 4 and 7, is moved forwardly and rests adjacent a front portion 110 of the bracket 54. When the handle 52 is in this position, the pin 60 is positioned to be seated within the forward notch 64 as shown in FIG. 7. As this forward movement of the handle 52 occurs, the cranks 34,36 move in the opposite or rearward direction.

Each of the baffles 82 includes an extension 112. When the gates 70, 72 and 74 are drawn to their closed position, they angularly extend or project from the front baffles 76, 78 and 80 and align with the extensions 112 of the rear baffle 82. Further, gate 74 blocks the discharge opening 67. After such projection and blocking occurs, the pathway "A" is substantially closed so as permit operation of the deck in its discharge mode.

As further shown in FIG. 5, the discharge gate 74 is preferably provided as a single swingable plate that is hingedly connected with the deck 18. A rod 114 is connected at one of its ends to the gate 72 and at its other end to the discharge gate 74. Because of this connection, the discharge gate 74 may be moved downwardly to block the discharge opening 67 when the gates 70,72 are moved to their closed position. With the gates 70,72 and 74 in their closed position, movement of vegetation clippings through the pathway "A" is restricted. This restriction forces cut vegetation to be deflected off of the gates 70,72 and 74 and baffle portions 76, 78, 80, and 82 into the path of the blades. After being deflected, the vegetation is cut again and then forced downwardly toward the ground surface.

As also shown in FIG. 5, each of the extensions 112 are slightly smaller in height than the plates 104 and the full length of their extensions 116, as shown at 118. Such a difference in height prevents contact between each of the blades and the extensions 112 and 116 as the blades rotate, all without substantially affecting the mulching capability of a particular cutting chamber.

Additionally, when the gates 70 and 72 move from their mulching to discharge position, their plates 102 move toward the front 106 of the deck 18 first. Plates 104 follow and overlap or lay on top of the plates 102 as shown in FIG. 3. When this overlay occurs, a substantially continuous surface is provided along the length of gates 70 and 72 along which vegetation may flow without contacting any edge or opposing surface thereof. If plates 104 folded toward the front 106 of the deck 18 first, plates 102 would provide an edge that would create a small crevice in which vegetation could collect and disrupt proper functioning of the gates 70,72. Also, such an overlay would provide an edge 119 along the end of plate 102, as shown in FIG. 3, that would oppose the flow of vegetation toward the discharge opening 67 and thereby interrupt its proper circulation within the cutting chamber(s). Also, with retraction of the gates 70,72 toward the front 106 of the deck 18 in the order described, extensions 116 are able to deflect vegetation into the pathway "A". This deflection prevents the vegetation from moving behind the gates 70,72. Further, if the plates 104 folded first so as to cause plates 102 to overlap them, the extensions 116 of the plates 104 would cause a large gap in which vegetation would collect rather than be circulated within the chamber(s). Thus, it may be understood that each of these benefits as described in connection with the overlay of gates 70 and 72 assists in permitting proper circulation of vegetation in the cutting chamber(s). Also, proper functioning of the gates 70,72 and proper discharge of the vegetation is also permitted.

As shown in each of FIGS. 3 and 5, an angled bracket 120 is secured to the underside of the deck 18 and acts as a stop that prevents unintended movement of the gates 70,72 into the pathway of the blades 90, 92 and 94 as they rotate.

Thus, there is provided a cutting deck which is convertible between a discharge mode of operation and a mulching mode of operation. In providing such a deck, an operator can avoid having to install or remove separate mulching equipment on a stock discharge deck. Accordingly, the operator does not have to spend additional time and/or money when desiring the capability to mow in either of these modes as conditions may require.

Having described the preferred embodiment, it will become apparent that various modifications can be made without departing from the scope of the invention as defined in the accompanying claims.

We claim:

1. A mower cutting deck comprising:
 a) a top member;
 b) a wall member extending downwardly from the top member, the wall member assisting in forming a plurality of adjacent cutting chambers, the wall member also including an opening therein through which vegetation is discharged;
 c) a plurality of cutting blades with one of the blades being carried within each of the plurality of cutting chambers for cutting the vegetation, each of the blades being rotatable to direct vegetation along a flow pathway that extends between the cutting chambers and out of the discharge opening; and
 d) a plurality of gates cooperable with the wall member and shiftable between a first position to permit movement of cut vegetation through the pathway and a second position to substantially enclose the chambers with the wall member and thereby substantially restrict the vegetation from flowing along the pathway, each of the gates being shiftable between their first and second positions by a common control structure.

2. The mower deck as recited in claim 1 wherein:
the plurality of gates includes at least a first and a second gate.

3. The mower deck as recited in claim 2 wherein:
in their first position, the at least two gates substantially align with a first portion of the wall member to permit the vegetation to flow along the pathway, and in their second position, the at least two gates substantially and angularly project from the first portion to substantially close the pathway to restrict the flow of vegetation associated with a respective cutting chamber from exiting the chamber, thereby enabling repeated cutting of that vegetation and forcing of it toward the ground surface as the deck is repositioned across the ground surface.

4. The mower deck as recited in claim 3 wherein:
at least one of the gates comprises first and second plates that overlap to provide a surface, along the length of the at least one gate, that is substantially free of an edge that opposes the flow of vegetation when the at least two gates are in their open position.

5. A mower cutting deck comprising:
 a) a top member;
 b) a wall member extending downwardly from the top member, the wall member assisting in forming a plurality of adjacent cutting chambers, the wall member also including an opening therein through which vegetation is discharged;
 c) a plurality of cutting blades with one of the blades being carried within each of the plurality of cutting chambers for cutting the vegetation as the deck moves across the ground surface, each of the blades being rotatable to also direct vegetation along a flow pathway that extends between the cutting chambers and out of the discharge opening; and
 d) a manually operable plurality of gates associated with the wall member for substantially enclosing each of the chambers, the gates being operable to permit or restrict movement of cut vegetation along the pathway, each of the gates being operated by a common control structure.

6. The mower deck as recited in claim 5 wherein:
the control structure is connected with the gates for selectively operating and moving the gates to either permit or restrict movement of the vegetation along the pathway.

7. The mower deck as recited in claim 6 wherein:
the series of gates includes at least first, second and third gates.

8. The mower deck as recited in claim 7 wherein:
the first and second gates include at least a pair of members and the third gate includes at least one member.

9. The mower deck as recited in claim 8 wherein:

when each of the gates permits cut vegetation to flow along the pathway, the first and second gates substantially align with a first portion of the wall member to permit vegetation to flow between the adjacent cutting chambers and toward the discharge opening and the third gate substantially aligns with the top member so as to permit the vegetation to move through the discharge opening, and when each of the gates restricts cut vegetation from flowing along the pathway, the first and second gates substantially and angularly project from the first portion to substantially close the pathway between the adjacent cutting chambers to restrict the flow of vegetation within a respective cutting chamber from exiting the chamber and the third gate blocks the discharge opening to substantially prevent the vegetation from flowing through the discharge opening, thereby enabling repeated cutting of the vegetation in each of the chambers and forcing of it toward the ground surface as the blades rotate.

10. A mower cutting deck comprising:

a top member having a top surface and a bottom surface;

a skirt member depending downwardly from the top member and defining an underside of the deck, the skirt member further including an opening through which vegetation may be discharged;

a plurality of rotatable blades for cutting vegetation, each of the blades being mounted to a respective spindle, extending through the top surface of the deck, for rotation therewith;

a plurality of baffle portions connected with the bottom surface and the skirt member for partially defining a cutting chamber associated with each of the blades and for defining a pathway extending between the cutting chambers and out of the discharge opening and along which vegetation is circulated as the blades rotate, the baffle portions also directing vegetation cut by each of the blades from one of the cutting chambers toward an adjacent chamber and through the discharge opening;

a plurality of gates including at least first, second and third gates, each of the gates being operatively connected with the bottom surface; and a control structure operatively connected with the gates, the control structure being moveable to actuate the first, second and third gates between either an opened or closed position, the open position permitting the flow of vegetation between the cutting chambers and through the discharge opening, the closed position restricting the flow of vegetation between the cutting chambers by causing the first, second and third gates to substantially adjoin with the plurality of baffle portions to create a circumferential periphery that limits movement of vegetation between adjacent chambers and through the discharge chute and which assists in forcing the vegetation to move downwardly toward the ground.

11. The mower deck as recited in claim 10 wherein:

the control structure includes a pair of cranks pivotally connected by a linkage therebetween, the control structure further including a handle and bracket arrangement, one of the pair being connected with the handle so that movement of the handle moves each of the cranks.

12. The mower deck as recited in claim 11 wherein:

the bracket includes a slot therein and the handle includes a pin extending therefrom and which is positionable within the slot for enabling selective restraint of the handle as it is moved relative to the bracket.

13. The mower deck as recited in claim 12 wherein:

each of the cranks is operatively connected to the gates so that movement of the handle causes each of the gates to be moved to their open or closed position.

* * * * *